United States Patent [19]

Fukuda

[11] Patent Number: 5,088,196
[45] Date of Patent: Feb. 18, 1992

[54] PIPE CUTTER

[75] Inventor: Kenji Fukuda, Tokyo, Japan

[73] Assignee: Nitto Kohki Co., Ltd., Tokyo, Japan

[21] Appl. No.: 617,355

[22] Filed: Nov. 23, 1990

[30] Foreign Application Priority Data

Mar. 12, 1990 [JP] Japan .................. 2-24798[U]

[51] Int. Cl.⁵ .................. B26D 3/16; B26D 1/04; B23D 21/08; B23D 21/06
[52] U.S. Cl. ..................... 30/102; 30/94; 30/95; 30/101
[58] Field of Search ............ 30/92.5, 95, 94, 96, 30/97, 98, 101, 102

[56] References Cited

U.S. PATENT DOCUMENTS

| | | | |
|---|---|---|---|
| 4,802,278 | 2/1989 | VanderPol et al. | 30/101 |
| 4,831,732 | 5/1989 | Garton | 30/101 |
| 4,890,385 | 1/1990 | VanderPol et al. | 30/101 |

Primary Examiner—Douglas D. Watts
Assistant Examiner—Paul M. Heyrana, Sr.
Attorney, Agent, or Firm—Jones, Tullar & Cooper

[57] ABSTRACT

A pipe cutter is disclosed in which a housing carries a disk which is rotated selectively in a forward direction or in a reverse direction by a power drive. The disk has a pipe receiving slot extending to the central axis of rotation of the disk for receiving a pipe to be cut. A cutter blade and rotatable roller are disposed on the disk in symmetrical locations about the central axis of rotation, the cutter blade being adapted to move linearly into and out of contact with the pipe which is inserted into the receiving slot. The roller, which preferably is a pair of spaced rollers, is engageable with the outer peripheral surface of the pipe at a location generally opposite to the location of the cutter. A holder for supporting the cutter blade is mounted on the disk for rotation therewith about the central axis of rotation and is also mounted for linear motion toward and away from the central axis of rotation. A rotating mechanism engages the peripheral edge of the housing around the central axis of rotation and in response to rotation of the disk, is rotated about its own axis. A worm mechanism is connected to be driven by the rotating mechanism. A rotational motion to linear motion converting mechanism is connected directly with the worm mechanism and converts its rotational motion to linear motion to drive the holder to thereby move the cutter blade into and out of contact with the pipe.

2 Claims, 2 Drawing Sheets ical field

This invention relates to improvements on pipe cutters of the type which are arranged to cut a pipe while grasping the pipe in a three-point supporting manner.

BACKGROUND ART

The conventional pipe cutter arranged to cut a pipe while grasping it in a three-point supporting manner includes rotary cutter blades radially adjustable to accommodate the outer diameter of the pipe to be cut, the arrangement being such that the pipe is cut while revolving the cutter blades around the axis of the pipe after it is inserted between and grasped by the cutter blades. Such arrangements are well known.

With prior art pipe cutters in which the cutter blades are caused to revolve around the pipe during the cutting operation, the operator must turn the handle of the cutter around its central axis of rotation, about which the cutter blades are disposed, in order to perform the cutting operation. However, the operation of turning the handle is often interfered with by structures in the vicinity of the piping; for example, as in the case of cutting a portion of piping fixed to or embedded in a wall structure. Further, the prior art pipe cutters had the disadvantage that an unexpectedly great force was required, making it difficult to accomplish the cutting operation in an efficient manner.

SUMMARY OF INVENTION

It is the object of the invention to overcome the aforesaid drawbacks to prior pipe cutters by providing a pipe cutter capable of cutting pipes without the need for especially great forces and without the need for turning the handle as required with prior pipe cutters.

Briefly, the present invention provides a pipe cutter comprising a housing, with a disk mounted in the housing so as to be rotated selectively in a forward direction and a reverse direction by a power drive. The disk has a pipe receiving slot extending to the central axis of rotation of the disk for receiving a pipe to be cut. A cutter blade and rotatable roller are disposed on the disk in symmetrical locations about the central axis of rotation, the cutter blade being adapted to move linearly into and out of contact with the pipe inserted in the receiving slot, and the roller being engageable with the outer peripheral surface of the pipe. A holder for supporting the cutter blade is mounted on the disk for rotation therewith about the central axis of rotation, and for linear motion toward and away from the central axis of rotation across the disk. A rotating mechanism is adapted to be rotated on its own axis while revolving along the peripheral edge of the housing around the central axis of rotation in response to the rotation of the disk, and a worm mechanism is connected to be driven by the rotating mechanism. A rotational motion to linear motion converting mechanism connected directly with the worm mechanism converts the rotational motion of the worm mechanism to the linear motion of the holder to thereby move the cutter blade into and out of contact with the pipe.

In operation, with the pipe receiving slot inserted over a laid or unlaid pipe, the power drive, such as an electric motor, is energized to rotatively drive the disk, whereby the rotary cutter blade supported on the disk is caused to rotate around the pipe and to gradually move linearly toward the pipe as the disk is rotating until the pipe is three-point supported by the rotary cutter blade and a pair of rollers. As the disk continues to rotate, the cutter blade is caused to cut into the pipe while revolving along the same circumference of the pipe and to sever the pipe as it enters radially inwardly into the pipe.

BRIEF DESCRIPTION OF THE DRAWINGS

These and other more detailed and specific objects and features of the present invention will be more fully disclosed in the following specification with reference to the accompanying drawings, in which.

DETAILED DESCRIPTION OF THE PREFERRED EMBODIMENT

Figure 1:
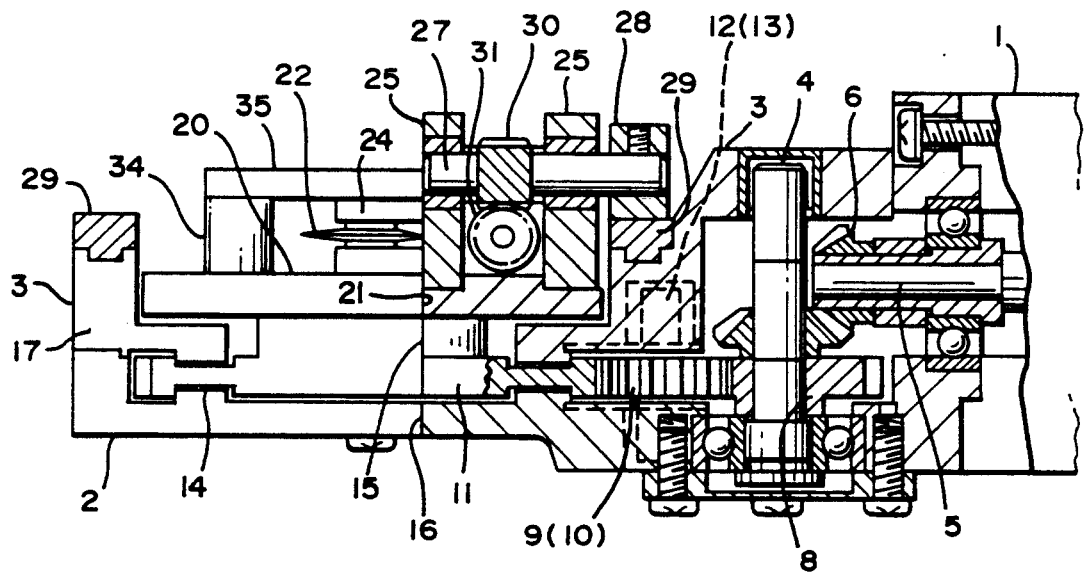
FIG. 1 is a cross-sectional view of the principal parts of the pipe cutter, with the main part of the handle and the rotative drive and reducer therein removed.

Referring to FIG. 1, one embodiment of the pipe cutter according to the present invention is shown which comprises a handle 1 in which a source of reversible drive (not shown) such as an electric motor is housed. Attached to the forward end of the handle is a base housing 2 to which a cover housing 3 is secured.

Extending axially from the forward end of the handle 1 is a drive shaft 5, the rotation of which is transmitted via a pair of bevel gears 6, 7 to an idler shaft 4 extending perpendicularly to the drive shaft.

Figure 3:
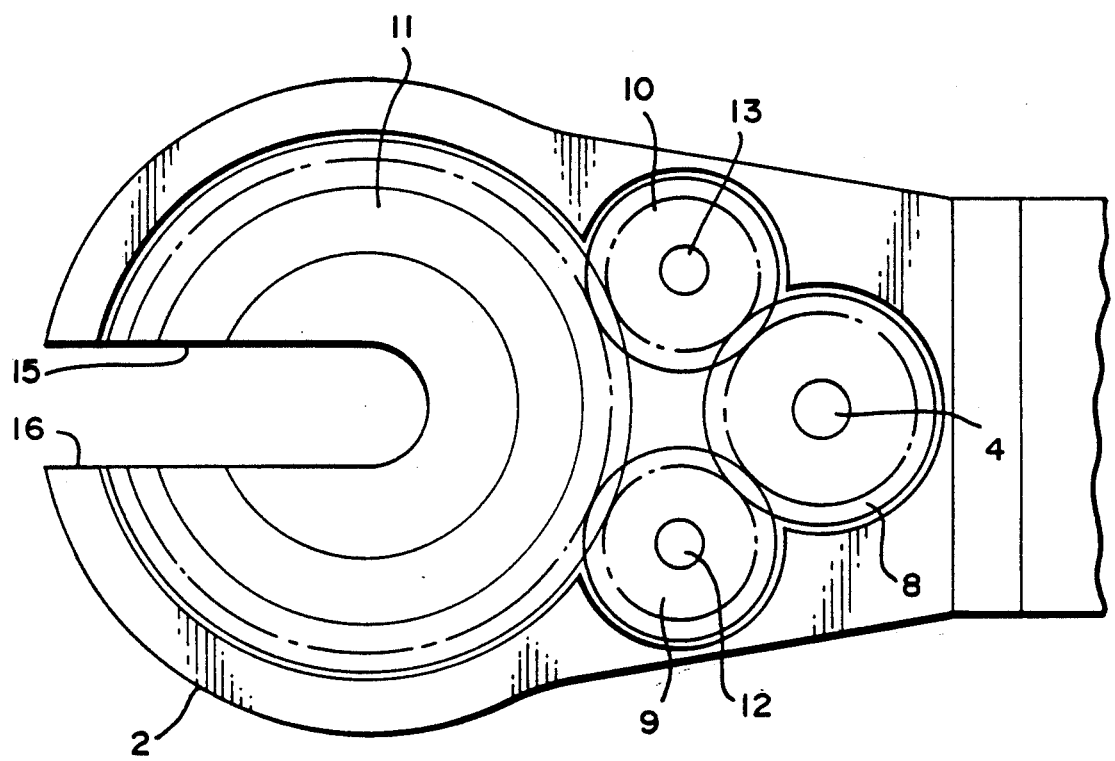
FIG. 3 is a side view showing the rotative drive system for the disk.

The idler shaft 4 is rotatably journalled in the base housing 2 and the cover housing 3. Fixed to one end of the idler shaft 4 is a spur gear 8 with which a pair of spur gears 9, 10 are in mesh. The spur gears 9 and 10 are positioned in symmetrical locations with respect to the spur gear 8 and spaced apart by a predetermined distance greater than the diameter of a pipe to be cut, and supported by shafts 12 and 13, respectively, as shown in FIG. 3. Another spur gear 11 is rotatably mounted in the base housing 2. The spur gear 11 has a greater number of teeth and a greater diameter than the spur gears 9 and 10 to transmit the rotation of the idler shaft 4 at a reduced speed. A ring 14 formed of fluoroplastic is disposed between the opposing faces of the base housing 2 and cover housing 3 to support the greater diameter spur gear 11 on the top and bottom surfaces of the gear with a low coefficient of friction.

As shown in FIG. 3, the spur gear 11 is formed with a generally U-shaped cutout 15 having a size accommodating the outer diameter of a pipe 40 (FIG. 2) which is to be cut. The cutout extends to the center of rotation of the spur gear for guiding the pipe to the center. Similarly, the base housing 2 and cover housing 3 are formed with cutouts 16 and 17, respectively, of the same size.

Figure 2:
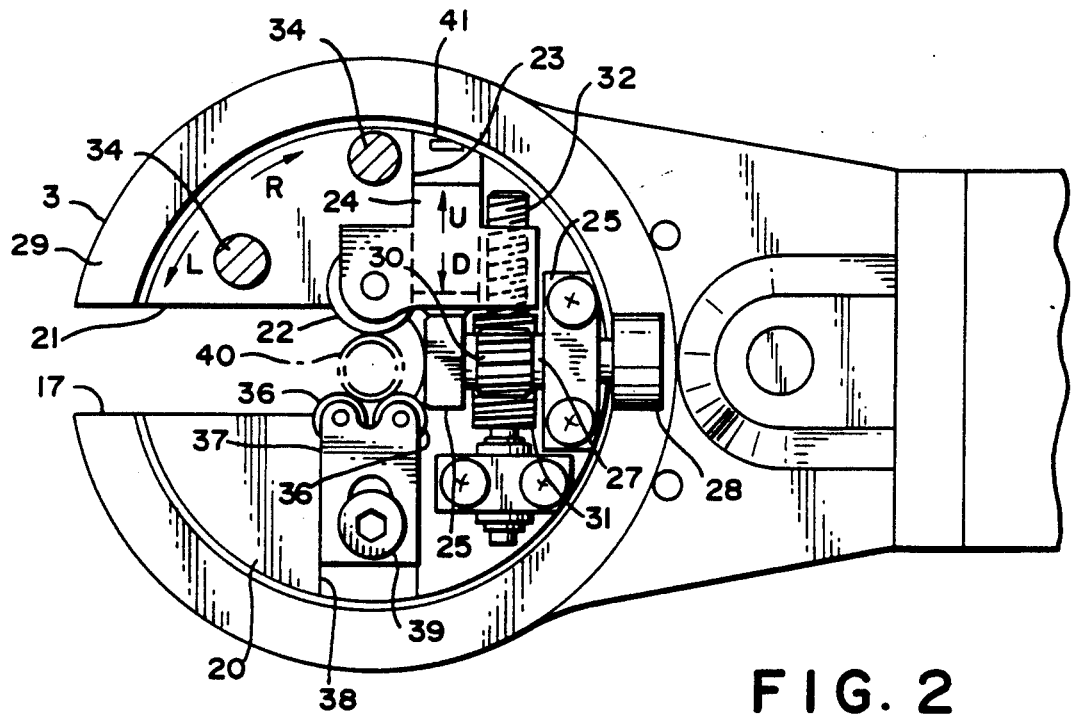
FIG. 2 is a side view of the principal parts of the pipe cutter with the cover for the rotary cutter blade removed.

As seen in FIGS. 1 and 2, a disk 20 is fixed to the top of the spur gear 11 and adapted to rotate within the inner periphery of the cover housing 3. The disk 20 is likewise formed with a cutout 21 for receiving a pipe to be cut as described above with respect to the spur gear 11. A circular cutter blade 22 is rotatably mounted at an eccentric position on the disk 20 by means of a holder 24. The holder 24 is fitted in a straight groove 23 formed in the top surface of the disk 20 as shown in FIG. 2 for slidable linear movements radially toward and away from the central axis of rotation of the disk 20. The cutter blade 22 is thus carried by the holder 24 for free rotation about its own axis and for linear movements into and out of engagement with the outer periphery of a pipe to be cut. The holder 24 is covered by a shroud 35 horizontally fixed by two posts 34, 34 outstanding from the disk 20 so as to prevent dislodgement of the holder from the straight groove 23 and to avoid unnecessary exposure of the rotary cutter blade 24.

A rotary shaft 27 is rotatably journalled in bearing blocks 25, 25 which are in turn secured to the disk 20. The shaft 27 extends normal to the direction in which the rotary cutter blade 22 moves toward and away from the central axis of rotation. A friction roller 28 is secured to one end of the rotary shaft 27 and adapted to bear against and roll on a rubber ring 29 affixed to the top surface of the stationary cover housing 3 along the periphery thereof, in the illustrated embodiment. As the disk 20 and hence the bearing blocks 25 and rotary shaft 27 carried by the disk rotate in unison about the central axis of rotation of the disk 20, the friction roller 28 is caused to rotate on its own axis by friction against the rubber ring 29 in unison with, and driving, the rotary shaft 27.

Fixed to the rotary shaft 27 is a worm wheel 30 which is in mesh with a worm 31 extending perpendicularly to the rotary shaft 27. The worm 31 is an extension having coaxial male threads 32 formed therearound in mesh with female threads formed in the holder 24 whereby the rotation of the friction roller 28 is converted into linear motion of the holder 24 supporting the rotary cutter blade 22. Thus, as the disk 20 is rotated in a direction indicated by an arrow R in FIG. 2, for example, the rotary cutter blade 22 is caused to gradually move in a direction D toward the central axis of rotation. Rotation of the disk in a reverse direction L causes the cutter 22 to move in a direction U away from the center of rotation.

Two rotating rollers 36, 36 are disposed on the opposite side of the central axis of rotation from the rotary cutter blade 22 such that the pipe 40 inserted in the pipe receiving slot 15 is grasped between the rotating rollers 36, 36 and the rotary cutter blade 22 in a three-point supporting fashion. A holder 37 for rotatably supporting the rotating rollers 36, 36 is slidably fitted in a straight groove 38 formed in the surface of the disk 20 so that the holder 37 may be moved radially toward and away from the central axis of rotation of the disk 20. The holder 37 may be locked in position on the disk 20 by a screw 39 after the position of the holder has been determined to accommodate the outer diameter of the pipe.

As shown in FIG. 2, a sensor 41 for detecting the retracted position of the cutter blade holder 24 is provided on the disk. The sensor 41 acts not only to stop the source of reversible drive, not shown, and make the rotary cutter blade 22 ready for cutting a pipe upon the holder 24 retracting into abutment against the sensor, but also acts to bring the cutouts 15, 21, 16 and 17 in the spur gear 11, disk 20 and the housings 2 and 3, respectively, into alignment with each other, as shown in FIG. 3.

The operation of the invention will now be described.

When it is desired to cut a pipe, the power drive source is first operated in a reverse direction. The rotation of the drive motor is reduced in speed and transmitted via the drive shaft 5 to the spur gear 11 which in turn rotates the disk 20 in a direction indicated by arrow L. The rotation of the disk 20 causes the friction roller 28 to roll on the rubber ring 29, the rotation of the roller 28 and hence the rotary shaft 27 being reduced in speed by means of the worm wheel 30 and worm 31. The rotation of the male threads 32, which are in threaded engagement with the female threads in the holder 24, moves the holder 24 along the straight groove 23 in a direction indicated by arrow U. The cooperating male threads 32 and female threads in the holder 24 constitute a rotational motion to linear motion converting mechanism. The holder 24 is thus retracted into abutment against the sensor 41, whereupon the reverse rotation of the drive source is stopped. In this position, the cutout or pipe receiving slot 15 in the spur gear 11 and the cutout 21 in the disk 20 are brought into alignment with the cutouts 16 and 17 in the base and cover housings 2 and 3, respectively, all being ready for receiving a pipe 40 therethrough while the rotary cutter blade 22 is retracted to a position where it is unexposed.

A pipe 40 is inserted in the pipe cutter, ready for cutting, and the amount of projection of the rollers 36 required to accommodate the outer diameter of pipe 40 is determined. The rollers 36 are then locked in place by the screw 39. With the handle 1 held in the operator's hand, the drive source is actuated in a forward direction. The rotation of the drive source in the forward direction causes rotation of the disk 20 in a forward direction, whereby the friction roller 28 is caused to roll in an opposite direction to thereby gradually move the holder 24, in threaded engagement with the male threads 32, along the straight groove 23 in the direction indicated by arrow D. While the rotary cutter blade 22 is thus advancing, the cutter blade 22 revolves around the pipe 40 in unison with the disk 20. When the cutting edge of the cutter blade 22 comes into contact with the pipe 40, the pipe is positively retained in a three-point supporting fashion by the symmetrically positioned cutter blade and guide rollers 36, 36, while the cutting edge of the cutter blade 22 cuts progressively into the pipe 40 on the same circumference thereof to sever the pipe as the holder 24 continues to advance.

Upon completely severing the pipe, the drive source is reversed as described hereinbefore to retract the holder 24 to move the rotary cutter blade 22 back to its standby position.

The above description is included to illustrate the preferred embodiment of the invention and is not meant to limit the scope of the invention. From the above discussion, many variations will be apparent to one skilled in the art that would yet be encompassed by the spirit and the scope of the invention.

For example, the rotary cutter blade 22 is not limited to a freely rotating circular cutter blade, but may comprise a curved blade secured to a holder. The friction type motion transmitting mechanism between the cover housing 3 and the rotating roller 28 for converting the rotation of the disk to forward-rearward gear attached to the housing cover. The rotational motion to linear motion converting mechanism connected directly with the worm mechanism may comprise an oscillating sector gear in mesh with a worm, for example, the oscillating end of the sector gear being connected to either a cutter blade or its holder so as to linearly displace the cutter blade, in substitution for the threaded mechanism linked directly to the worm as described hereinabove.

The pipe cutter according to the present invention is so arranged that the cutter blade is brought into contact with a pipe being cut by the use of a source of reversible drive, and so that the cutter blade, cooperating with two rollers to support the pipe in a three-point fashion, rotates to gradually cut into the surface of the pipe, with a progressive increase in the amount in which it cuts into the surface, to ultimately sever the pipe. The cutter is thus capable of cutting a pipe without the need for turning the handle and without requiring great forces. Consequently, it provides the advantage, among others, of facilitating the cutting operation of piping as laid.

Moreover, according to the present invention, the center of rotation of the rotary cutter blade is linearly moved so that the cutting position may be at a constant distance with respect to the center of the pipe. This provides the advantages of making the cutting position readily visible from the exterior and making it possible to simplify the mechanism for moving the cutter blade into and out of contact with the pipe.

What is claimed is:

1. A pipe cutter comprising:
   housing means;
   a disk mounted in the housing means so as to be rotated selectively in a forward direction and a reverse direction by a power drive, said disk having a pipe receiving slot extending to the central axis of rotation of the disk for receiving a pipe to be cut;
   a cutter blade and rotatable roller means disposed on said disk in symmetrical locations about the central axis of rotation, said cutter blade being adapted to move linearly into and out of contact with the pipe inserted in said receiving slot, and said roller means being engageable with the outer peripheral surface of the pipe;
   a holder for supporting said cutter blade, said holder being mounted on said disk for rotation therewith about the central axis of rotation and for linear motion toward and away from the central axis of rotation across the disk;
   rotating means adapted to be rotated on its own axis while rovolving along the peripheral edge of said housing means around said central axis of rotation in response to the rotation of the disk;
   a worm wheel carried by said disk and connected to said rotating means to be driven by the rotating means; and
   a worm carried by said disk and in mesh with said worm wheel and having an externally threaded extension shaft;
   said holder having an internally threaded portion in mesh with said externally threaded extension shaft of said worm, whereby the holder and the cutter blade are caused to move linearly toward and away from the central axis of rotation by means of said rotating means, worm wheel, worm and externally threaded extension shaft in response to the rotation of the disk in a forward direction and a reverse direction, respectively.

2. A pipe cutter comprising:
   housing means;
   a disk mounted in the housing means so as to be rotated selectively in a forward direction and a reverse direction by a power drive, said disk having a pipe receiving slot extending to the central axis of rotation of the disk for receiving a pipe to be cut;
   a cutter blade and rotatable roller means disposed on said disk in symmetrical locations about the central axis of rotation, said cuter blade being adapted to move linearly into and out of contact with the pipe inserted in said receiving slot, and said roller means being engageable with the outer peripheral surface of the pipe;
   a holder for supporting said cutter blade, said holder being mounted on said disk for rotation therewith about the central axis of rotation and for linear motion across said disk toward and away from the central axis of rotation of the disk;
   rotating means mounted on said disk and engaging the peripheral edge of said housing, said rotating means being rotated on its own axis while revolving along the peripheral edge of said housing means around said central axis of rotation in response to the rotation of the disk;
   an externally threaded shaft rotatably mounted on said disk;
   gear means responsive to the rotation of said rotating means for driving said externally threaded shaft;
   said holder having an internally threaded portion in mesh with said externally threaded shaft, whereby the holder and the cutter blade are caused to move linearly toward and away from the central axis of rotation of said disk by means of said rotating means, said gear means, and said externally threaded shaft in response to the rotation of the disk in a forward direction and a reverse direction, respectively.

* * * * *